(12) United States Patent
Oh et al.

(10) Patent No.: US 10,464,816 B2
(45) Date of Patent: Nov. 5, 2019

(54) AEROGEL BLANKET FOR ULTRA-HIGH TEMPERATURE, PRODUCTION METHOD THEREOF, AND CONSTRUCTION METHOD THEREOF

(71) Applicant: LG CHEM, LTD., Seoul (KR)

(72) Inventors: Kyoung Shil Oh, Daejeon (KR); Je Kyun Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/766,318

(22) PCT Filed: Oct. 10, 2017

(86) PCT No.: PCT/KR2017/011119
§ 371 (c)(1),
(2) Date: Apr. 5, 2018

(87) PCT Pub. No.: WO2018/070752
PCT Pub. Date: Apr. 19, 2018

(65) Prior Publication Data
US 2019/0010060 A1    Jan. 10, 2019

(30) Foreign Application Priority Data

Oct. 12, 2016  (KR) .......................... 10-2016-0132167

(51) Int. Cl.
*C01B 33/158* (2006.01)
*F16L 59/14* (2006.01)
(Continued)

(52) U.S. Cl.
CPC .......... *C01B 33/1585* (2013.01); *B01J 23/04* (2013.01); *B01J 27/24* (2013.01); *B01J 31/0237* (2013.01);
(Continued)

(58) Field of Classification Search
CPC ................................................. C01B 33/1585
(Continued)

(56) References Cited

U.S. PATENT DOCUMENTS

2004/0149654 A1  8/2004  Takahashi et al.
2007/0004306 A1  1/2007  Leeser et al.
(Continued)

FOREIGN PATENT DOCUMENTS

CN    102515181         6/2012
CN    102515181 A  *    6/2012
(Continued)

*Primary Examiner* — Tabatha L Penny
(74) *Attorney, Agent, or Firm* — Dentons US LLP

(57) ABSTRACT

The present invention relates to a hydrophilic silica aerogel blanket for ultra-high temperature insulation, a production method thereof, and a construction method thereof. More specifically, the present invention provides a production method a hydrophilic silica aerogel blanket, the method capable of strengthening the structure of a silica gel by adding a basic catalyst in an aging step, reducing processing time and cost by omitting a surface modification step, thereby reducing manufacturing cost, and suppressing the generation of a bad odor during construction by fundamentally blocking a volatile organic compound (VOC), a hydrophilic silica aerogel blanket produced thereby, and a construction method of a hydrophilic silica aerogel blanket, the method capable of suppressing the generation of a bad odor when constructing the hydrophilic aerogel blanket on an ultra-high temperature piping equipment, and at the same time, preventing the loss of heat insulation performance due to moisture in the air.

10 Claims, 4 Drawing Sheets

(51) Int. Cl.
- *B01J 23/04* (2006.01)
- *B01J 27/24* (2006.01)
- *B01J 31/02* (2006.01)
- *F16L 59/02* (2006.01)

(52) U.S. Cl.
CPC ......... *B01J 31/0244* (2013.01); *F16L 59/028* (2013.01); *F16L 59/029* (2013.01); *F16L 59/14* (2013.01); *C01P 2006/32* (2013.01)

(58) Field of Classification Search
USPC .................................................... 427/376.1
See application file for complete search history.

(56) References Cited

U.S. PATENT DOCUMENTS

2011/0252739 A1 10/2011 Leeser et al.
2013/0330262 A1 12/2013 Kaneko et al.
2014/0252263 A1 9/2014 Besselievre et al.
2018/0010726 A1 1/2018 Kim et al.

FOREIGN PATENT DOCUMENTS

| | | | |
|---|---|---|---|
| CN | 203230966 U | * | 10/2013 |
| CN | 103833041 | | 6/2014 |
| CN | 104496401 | | 4/2015 |
| EP | 3257812 | | 12/2017 |
| JP | 2011136859 | | 7/2011 |
| JP | 2014532031 | | 12/2014 |
| KR | 1020100053350 | * | 5/2010 |
| KR | 10-1299347 | | 8/2013 |
| KR | 10-2015-0089319 | | 8/2015 |
| KR | 10-2016-0100082 | | 8/2016 |
| WO | 2002085785 | | 10/2002 |
| WO | 2012172733 | | 12/2012 |
| WO | 2016129874 | | 8/2016 |

* cited by examiner

COMPARATIVE EXAMPLE 3  EXAMPLE 1

AEROGEL BLANKET FOR ULTRA-HIGH TEMPERATURE, PRODUCTION METHOD THEREOF, AND CONSTRUCTION METHOD THEREOF

CROSS-REFERENCE TO RELATED APPLICATIONS

This application is a National Stage Application of International Application No. PCT/KR2017/011119 filed on Oct. 10, 2017, which claims priority to and the benefit of Korean Patent Application No. 10-2016-0132167, filed on Oct. 12, 2016, in the Korean Intellectual Property Office, both of which are herein in their entirety by reference for all purposes as if fully set forth herein.

TECHNICAL FIELD

The present invention relates to a hydrophilic silica aerogel blanket for ultra-high temperature insulation, a production method thereof, and a construction method thereof.

BACKGROUND ART

An aerogel is a superporous, high specific surface area (≥500 m$^2$/g) material having a porosity of about 90 to 99.9% and a pore size in the range of 1 to 100 nm, and is a material excellent in ultra-light weight, super heat insulation, ultra-low dielectric, and the like. Accordingly, research on the development of aerogel materials as well as research on the practical use thereof as transparent insulation materials, environmentally friendly high temperature insulation materials, ultra-low dielectric thin films for highly integrated devices, catalysts and catalyst carriers, electrodes for supercapacitors, and electrode materials for seawater desalination have been actively studied.

The biggest advantage of the aerogel is that the aerogel has a super-insulation exhibiting a thermal conductivity of 0.03 W/m·K or less, which is lower than that of an organic insulation material such as conventional Styrofoam, and that fire vulnerability and the occurrence of harmful gases in case of fire which are fatal weaknesses of the organic insulation material can be solved.

On the other hand, since the aerogel has very low mechanical strength due to a porous structure thereof, an aerogel composite in which an aerogel is bonded to a fibrous blanket by being impregnated therewith, the fibrous blanket such as an inorganic fiber or an organic fiber, both of which are conventional heat insulation fibers, has been developed. The above aerogel blanket has flexibility so that it can be bent, folded, or cut in any size or shape, and easily handled. Thus, the aerogel blanket is used not only for industrial applications such as heat insulation panels for LNG carriers, industrial insulation materials, spacesuits, transportation, vehicles, and insulation materials for electric power production, but also for household goods such as jackets and sports shoes.

In general, an aerogel is produced by a silica sol preparation step, a gelation step, an aging step, a surface modification step, and a drying step.

However, an aerogel blanket produced by the above conventional method has two disadvantages.

First, in order to prevent the loss of heat insulation performance due to the absorption of moisture in the air by a silica aerogel blanket, the surface of the silica aerogel has been hydrophobized through surface modification to be used. However, in this case, there is a disadvantage in that production time is lengthened, and production cost is increased due to a high raw material cost of a surface modifier.

Second, when such hydrophobic silica aerogel blanket was directly constructed on a high temperature pipe of 500° C. or higher, there was a problem in that a serious bad odor was generated by a volatile organic compound (VOC) and the like, thereby causing pain to workers.

Therefore, the present inventors have developed a hydrophilic silica aerogel blanket for ultra-high temperature insulation, a production method thereof, and a construction method thereof.

PRIOR ART DOCUMENT

Patent Document 1

Korean Patent Application Publication No. 10-2016-0100082 (published on Aug. 23, 2016)

DISCLOSURE OF THE INVENTION

Technical Problem

An aspect of the present invention provides a production method of a hydrophilic silica aerogel blanket, the method capable of strengthening the structure of a silica gel by adding a basic catalyst in an aging step, reducing processing time and cost by omitting a surface modification step, thereby reducing manufacturing cost, and suppressing the generation of a bad odor by fundamentally blocking a volatile organic compound (VOC) when constructing the hydrophilic silica aerogel blanket on an ultra-high temperature piping equipment.

Another aspect of the present invention provides a hydrophilic silica aerogel blanket for ultra-high temperature insulation produced by the above production method.

Another aspect of the present invention provides a construction method of an aerogel blanket, the method capable of suppressing the generation of a bad odor when constructing a hydrophilic aerogel blanket produced by the above production method on an ultra-high temperature piping equipment, and at the same time, preventing the loss of heat insulation performance due to moisture in the air.

Technical Solution

According to an aspect of the present invention, there is provided a production method of a hydrophilic aerogel blanket including the steps of 1) preparing a silica sol by mixing a silica precursor, alcohol, and an acidic aqueous solution; 2) adding a basic catalyst to the silica sol, and then depositing the silica sol added with the basic catalyst in a base material for blanket; 3) subjecting the silica sol to a gelation reaction while being in a state of being deposited in the base material for blanket; 4) adding a mixed solution of a basic catalyst and alcohol to the silica gel produced upon the completion of the gelation reaction and aging the silica gel added with the mixed solution; and 5) drying the aged silica gel.

According to another aspect of the present invention, there is provided a hydrophilic aerogel blanket produced by the above production method.

According to another aspect of the present invention, there is provided a construction method of an aerogel blanket including the steps of 1) constructing at least one layer of the hydrophilic aerogel blanket on the surface of a piping equipment; and 2) constructing at least one layer of a hydrophobic aerogel blanket on the hydrophilic aerogel blanket.

Advantageous Effects

A production method of a hydrophilic aerogel blanket according to the present invention has an effect of strengthening the structure of a silica gel by adding a basic catalyst in an aging step. Therefore, even without going through a surface modification step, the silica gel may have good resistance to the shrinkage of the pores during a drying process, so that the surface modification step may be omitted resulting in the reduction of processing time and cost, and the reduction of manufacturing cost. In addition, there is an effect of suppressing the generation of a bad odor during construction by fundamentally blocking a volatile organic compound (VOC).

A construction method of an aerogel blanket according to the present invention has an effect of suppressing generation of a bad odor when constructing a hydrophilic aerogel blanket produced by the above production method on an ultra-high temperature piping equipment, and at the same time, preventing the loss of heat insulation performance due to moisture in the air.

BRIEF DESCRIPTION OF THE DRAWINGS

The following drawings attached herein illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Hereinafter, the present invention will be described in more detail to allow for a clearer understanding of the present invention. In this case, it will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Figure 1:
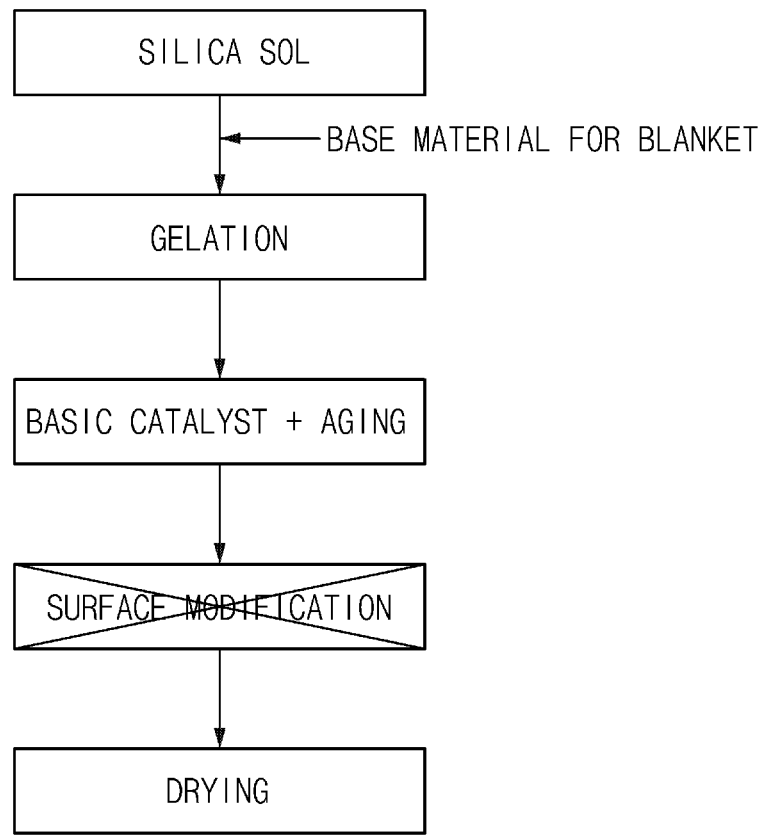
FIG. 1 is a flowchart schematically showing a production method of a hydrophilic aerogel blanket according to an embodiment of the present invention.

As shown in the flowchart of FIG. 1, a production method of a hydrophilic aerogel blanket according to an embodiment of the present invention is characterized in including the steps of 1) preparing a silica sol by mixing a silica precursor, alcohol, and an acidic aqueous solution; 2) adding a basic catalyst to the silica sol, and then depositing the silica sol added with the basic catalyst in a base material for blanket; 3) subjecting the silica sol to a gelation reaction while being in a state of being deposited in the base material for blanket; 4) adding a mixed solution of a basic catalyst and alcohol to the silica gel produced upon the completion of the gelation reaction and aging the silica gel added with the mixed solution; and 5) drying the aged silica gel.

A silica aerogel blanket is a material which is made of a silica aerogel material in the form of a mattress or a sheet by being composited with a fiber and the like as a base material for blanket, and has a characteristic of being bent, folded or cut due to the flexibility thereof. A silica aerogel imparts heat insulation properties due to the porosity thereof, and a base material for blanket such as a fiber serves to enhance the flexibility and mechanical strength of the silica aerogel blanket.

Such silica aerogel blanket is a new material superior in heat resistance and heat insulation to a polystyrene foam or a polyurethane foam, which is a conventional polymer insulation material, and is attracting attention as a high-tech material capable of solving the energy saving and environmental problems developed in the future. Accordingly, a silica aerogel blanket is used as an insulation material, a heat insulation material, or a non-flammable material for an aircraft, a ship, an automobile, a building structure, and the like, as well as for piping of various industrial facilities, or plant facilities for insulation and cooling such as an industrial furnace.

However, a silica aerogel blanket has a disadvantage in that water in the air is absorbed due to the hydrophilic properties of a silanol group (Si—OH) on the surface of a silica, so that the thermal conductivity is gradually increased. Also, there is a problem in that it is difficult to manufacture a super-insulation product having a meso pore since it is difficult to expect a spring break phenomenon due to the intensified pore destruction in a drying process.

Therefore, in order to maintain a low thermal conductivity by suppressing the absorption of moisture in the air, a step of modifying the surface of a silica aerogel so as to be hydrophobic is essentially required.

However, in the above hydrophobic surface modification step, a large amount of an organic solvent and an expensive hydrophobic agent are used, and also, a step of recovering and separating by-products generated in the surface modification step is essential. Thus, a production process of an aerogel blanket becomes complicated, and there are many uneconomical aspects in terms of time and cost, which makes it difficult to commercialize the aerogel blanket.

In addition, when a hydrophobic aerogel blanket, the surface of which has been hydrophobized by the above surface modification process, is directly constructed on an ultra-temperature pipe of 500° C. or higher, there is a problem in that a seriously bad odor is generated by a volatile organic compound (VOC) and the like, thereby causing pain to workers.

Accordingly, the present invention provides a production method of an aerogel blanket, the method capable of omitting a surface modification step of the aerogel blanket in order to reduce processing time and cost by simplifying a manufacturing process, and to suppress the generation of a bad odor.

Hereinafter, a production method of a hydrophilic aerogel blanket of the present invention will be described in detail, step by step.

Step 1)

Step 1) according to an embodiment of the present invention is a step of preparing a silica sol, wherein the silica sol is prepared by mixing a silica precursor, alcohol, and an acidic aqueous solution.

A silica precursor which can be used in the production of the silica sol may be an alkoxide-based compound containing silicon, specifically, tetraalkyl silicate such as tetramethyl orthosilicate (TMOS), tetraethyl orthosilicate (TEOS), methyl triethyl orthosilicate, dimethyl diethyl orthosilicate, tetrapropyl orthosilicate, tetraisopropyl orthosilicate, tetrabutyl orthosilicate, tetra secondary butyl orthosilicate, tetra tertiary butyl orthosilicate, tetrahexyl orthosilicate, tetracyclohexyl orthosilicate, and tetradodecyl orthosilicate. More specifically, in the case of the present invention, the silica precursor may be tetraethyl orthosilicate (TEOS).

The silica precursor may be used in an amount such that the content of silica ($SiO_2$) contained in a silica sol becomes 0.1 wt % to 30 wt %. If the content of the silica is less than 0.1 wt %, the content of a silica aerogel in the finally produced blanket is too low to achieve the desired level of heat insulation effect. If the content of the silica is greater than 30 wt %, due to an excessive formation of a silica aerogel, there is a possibility that the mechanical properties of the blanket, particularly the flexibility thereof may deteriorate.

In addition, alcohol which can be used in the production of the silica sol of the present invention may specifically be a monohydric alcohol such as methanol, ethanol, isopropanol, and butanol; or a polyhydric alcohol such as glycerol, ethylene glycol, propylene glycol, diethylene glycol, dipropylene glycol, and sorbitol, and any one or a mixture of two or more thereof may be used. When considering the miscibility thereof with water and an aerogel, the alcohol may be a monohydric alcohol having 1 to 6 carbon atoms such as methanol, ethanol, isopropanol, and butanol.

The above alcohol (polar organic solvent) may be used in an appropriate amount in consideration of the finally produced silica aerogel.

Also, an acidic aqueous solution which can be used in the production of a silica sol of the present invention may promote the gelation of the silica sol, later. An acid catalyst contained in the acidic aqueous solution may specifically include one or more kinds of inorganic acid such as nitric acid, hydrochloric acid, acetic acid, sulfuric acid, and hydrofluoric acid, and may be used in an amount so as to promote the gelation of the silica sol, later.

Step 2)

Step 2) according to an embodiment of the present invention is a step of preparing a silica gel composite, and may be performed by adding a basic catalyst to the silica sol and depositing the silica sol added with the basic catalyst in a base material for blanket.

The basic catalyst which can be used for producing a silica gel of the present invention serves to promote gelation by increasing the pH of the silica sol.

The basic catalyst may be an inorganic base such as sodium hydroxide and potassium hydroxide; or an organic base such as ammonium hydroxide. More specifically, the basic catalyst may be one or more selected from the group consisting of sodium hydroxide (NaOH), potassium hydroxide (KOH), calcium hydroxide ($Ca(OH)_2$), ammonium hydroxide ($NH_4OH$), tetramethylammonium hydroxide (TMAH), tetraethylammonium hydroxide (TEAH), tetrapropylammonium hydroxide (TPAH), tetrabutylammonium hydroxide (TBAH), methylamine, ethylamine, isopropylamine, monoisopropylamine, diethylamine, diisopropylamine, dibutylamine, trimethylamine, triethylamine, triisopropylamine, tributylamine, choline, monoethanolamine, diethanolamine, 2-aminoethanol, 2-(ethylamino) ethanol, 2-(methylamino) ethanol, N-methyldiethanolamine, dimethylaminoethanol, diethylaminoethanol, nitrilotriethanol, 2-(2-aminoethoxy) ethanol, 1-amino-2-propanol, triethanolamine, monopropanolamine, dibutanolamine and pyridine.

The basic catalyst may be included in an amount such that the pH of the silica sol becomes 4 to 8. If the pH of the silica sol is out of the above range, gelation is not easily achieved, or a gelation rate becomes too slow, thereby deteriorating the processability. In addition, since the base may be precipitated when added in a solid phase, it may be preferable that the base is added in the form of a solution diluted with the above alcohol (polar organic solvent).

Step 3)

Step 3) according to an embodiment of the present invention is a step of producing a silica gel composite, and may be performed by subjecting the silica sol to a gelation reaction while being in a state of being deposited in the base material for blanket.

Gelation of a production method of a hydrophilic aerogel blanket according to an embodiment of the present invention may be one forming a network structure from a silica precursor material, wherein the network structure may be a planar mesh structure in which specific polygons having one or more types of atomic arrangement are linked to each other, or a structure in which specific polyhedrons share their vertices, edges, faces, etc., with each other to form a three dimensional skeleton structure.

Specifically, the deposition may be performed in a reaction vessel capable of accommodating a base material for blanket, and may be performed either by pouring a silica sol into the reaction vessel, or by placing a base material for blanket in a reaction vessel containing a silica sol to be soaked. At this time, in order to improve the bonding of the base material for blanket and the silica sol, the base material for blanket may be lightly pressed down so as to be sufficiently deposited. Thereafter, the base material for blanket may be pressed to a predetermined thickness at a constant pressure to remove the remaining silica sol, so that drying time may be reduced.

A base material for blanket which can be used in the present invention may be a film, a sheet, a net, a fiber, a porous body, a foam, a non-woven body, or a laminate of two or more layers thereof. Also, according to the use of a base material for blanket, surface roughness may be formed or patterned on the surface thereof. More specifically, the base material for blanket may be a fiber capable of further improving the heat insulation performance by including a space or a void through which a silica aerogel may be easily inserted into the base material for blanket. Furthermore, the base material for blanket may preferably have a low thermal conductivity.

Specifically, the base material for blanket may be polyamide, polybenzimidazole, polyaramid, an acryl resin, a phenol resin, polyester, polyetheretherketone (PEEK), polyolefin (for example, polyethylene, polypropylene, or a copolymer thereof, and the like), cellulose, carbon, cotton, wool, hemp, a non-woven fabric, a glass fiber, or ceramic wool, and the like. More specifically, the base material for blanket may include a glass fiber or polyethylene.

Step 4)

Step 4) according to an embodiment of the present invention is a step of strengthening the structure of an aerogel, and may be performed by a step of adding a mixed solution of a basic catalyst and alcohol to the silica gel produced upon the completion of the gelation reaction and aging the silica gel added with the mixed solution.

As the basic catalyst to be added in the aging step of the present invention, sodium hydroxide (NaOH), potassium hydroxide (KOH), ammonium hydroxide ($NH_4OH$), triethylamine and pyridine may be used. More specifically, potassium hydroxide (KOH) or ammonium hydroxide ($NH_4OH$) may be used.

The aging is a process in which the silica gel is left at an appropriate temperature such that the chemical change thereof may be completely achieved. By performing the aging step of the present invention, the formed network structure may be more firmly formed, so that the mechanical stability of an aerogel blanket of the present invention may be enhanced.

In the aging step of the present invention, an excess of a specific basic catalyst may be added to enhance a silica gel structurally. The basic catalyst may induce Si—O—Si bonding in an aerogel to a maximum degree to further strengthen the network structure of the silica gel. Therefore, there is an effect of facilitating the maintenance of the pore structure in a fast supercritical drying process to be performed afterwards.

Also, the basic catalyst should be added in an appropriate amount to strengthen the pore structure of the silica gel. According to the present invention, in the case of ammonium hydroxide, ammonium hydroxide is added in an amount of 10 to 20 vol % based on ethanol, and in the case of potassium hydroxide, potassium hydroxide is added in an amount of 0.05 to 0.15 g/L based on ethanol. In the case of the above ammonium hydroxide, if ammonium hydroxide is added in a small amount of less than 10 vol %, or in a large amount of greater than 20 vol %, it is impossible to strengthen the pore structure of the silica gel, which is an objective of the present invention. Thus, if a separate hydrophobic process is not performed, the pore structure may easily be destructed in a drying process so that the density is increased resulting in a problem of the deterioration of heat insulation performance.

In the case of the above potassium hydroxide, if potassium hydroxide is added in a small amount of less than 0.05 g/L based on ethanol, as seen in the case of ammonium hydroxide, there may be a problem in that strengthening the pore structure, which is an objective of the present invention, may not be achieved. If potassium hydroxide is added in an excessive amount of greater than 0.15 g/L, the bonding force between the base material for blanket and the silica gel is reduced so that a large amount of silica gel may be separated resulting in problems of the deterioration of heat insulation performance and the generation of high dust.

In addition, the aging should be performed in an appropriate temperature range for optimum pore structure enhancement.

The aging of the present invention may be performed by leaving the silica gel added with the mixed solution at a temperature of 30 to 70° C. for 1 to 10 hours. If an aging temperature is lower than 30° C., aging time is excessively lengthened leading to an increase of the total processing time resulting in a problem of the deterioration of productivity. If an aging temperature is higher than 70° C., since the temperature is out of the boiling point of ethanol, the loss of solvent due to evaporation become large resulting in a problem of an increase in the raw material cost.

According to an embodiment of the present invention, a silica gel composite of the present invention, which has gone through the aging step of adding the basic catalyst, is characterized in not going through a surface modification step.

This is because, as described above, a hydrophilic aerogel blanket of the present invention has good resistance good resistance to the shrinkage of the pores during a fast supercritical drying process without going through a surface modification step.

On the other hand, a silica gel composite which has not gone through the aging step of adding the basic catalyst has poor resistance to the shrinkage of the pores during a drying process due to the hydrophilic properties of a silanol group (Si—OH) on the surface of a silica so that a surface modification step is essentially needed.

The present invention is characterized in that a surface modification step is not performed. Thus, a large a large amount of an organic solvent and an expensive hydrophobic agent are not needed so that manufacturing cost is reduced. Also, a step of recovering and separating by-products generated in the surface modification step is not needed so that there is an effect of simplifying a process.

In addition, there is an effect of improving workability by reducing a volatile organic compound (VOC) which is the cause of a bad odor generated when a hydrophobic aerogel blanket is constructed on a high temperature pipe of 500° C. Therefore, a hydrophilic aerogel blanket of the present invention is for ultra-high temperature insulation of 500° C. or higher.

Step 5)

Step 5) according to an embodiment of the present invention is a step for producing an aerogel blanket, and may be performed through a drying process for removing a solvent while maintaining the pore structure of the aged silica gel. The drying process may be performed by an ambient drying process or a supercritical drying process.

Carbon dioxide ($CO_2$) is in a gaseous state at room temperature and atmospheric pressure. However, when a temperature and pressure exceed a predetermined temperature and pressure limit called a supercritical point, the evaporation process does not occur so that carbon dioxide becomes to be in a critical state in which gas and liquid cannot be distinguished. Carbon dioxide in a critical state is referred to a supercritical carbon dioxide.

A supercritical carbon dioxide has a molecular density close to that of a liquid, however, has a low viscosity, thereby having properties close to those of gas. Therefore, a supercritical carbon dioxide has a high diffusion rate and a high thermal conductivity so that drying efficiency thereof is high, and drying process time may be shortened.

The present invention includes a step of aging by adding the above basic catalyst. Thus, the pore structure is strengthened, and therefore is resistant to the destruction of the pore structure during the fast supercritical drying process so that a low density and a low thermal conductivity may be maintained.

Specifically, the supercritical drying process performs a solvent substitution process in which an aged silica gel is placed into a supercritical drying reactor, $CO_2$ in a liquid state is filled therein, and an alcohol solvent inside a silica aerogel is substituted with $CO_2$. Thereafter, the temperature is raised to 40 to 50° C. at a certain temperature raising rate, specifically, 0.1° C./min to 1° C./min, and the pressure which is greater than a pressure at which carbon dioxide becomes a supercritical state, specifically, pressure of 100 bar to 150 bar is maintained to allow the carbon dioxide to remain in a supercritical state for a certain amount of time, specifically for 20 minutes to 1 hour. In general, carbon dioxide becomes to be in a supercritical state at a temperature of 31° C. and pressure of 73.8 bar. The carbon dioxide is maintained to remain at a certain temperature and certain pressure, at which the carbon dioxide becomes supercritical, for 2 hours to 12 hours, more specifically, 2 hours to 6 hours, and then, the pressure is generally lowered to complete the supercritical drying process so that a hydrophobic silica aerogel may be produced.

Also, in the case of an atmospheric drying process, a typical method such as natural drying under atmospheric pressure (1±0.3 atm) may be performed.

Meanwhile, a production method according to an embodiment of the present invention may further perform a washing step before the drying. The washing is a step for removing impurities (sodium ions, unreacted substances, by-products, and the like) generated during the reaction to obtain a hydrophobic silica aerogel with high purity, and may be performed through a dilution process or an exchange process using a nonpolar organic solvent.

In addition, the present invention may provide a hydrophilic aerogel blanket produced by the production method of the present invention.

Meanwhile, the heat insulation property of an aerogel blanket increases as the content of a silica aerogel in a blanket increases. However, if the content is too high, due to low strength and adhesive force of the silica aerogel itself, there is a concern that strength and adhesive force of a blanket may rather be deteriorated when the blanket is produced. Therefore, it is preferable that the content of a silica aerogel contained in a blanket is appropriately adjusted in consideration of the use of the blanket. Specifically, in the case of the present invention, the silica aerogel may be included in an amount of 20 wt % to 80 wt % based on the total weight of a silica aerogel blanket.

Figure 2:
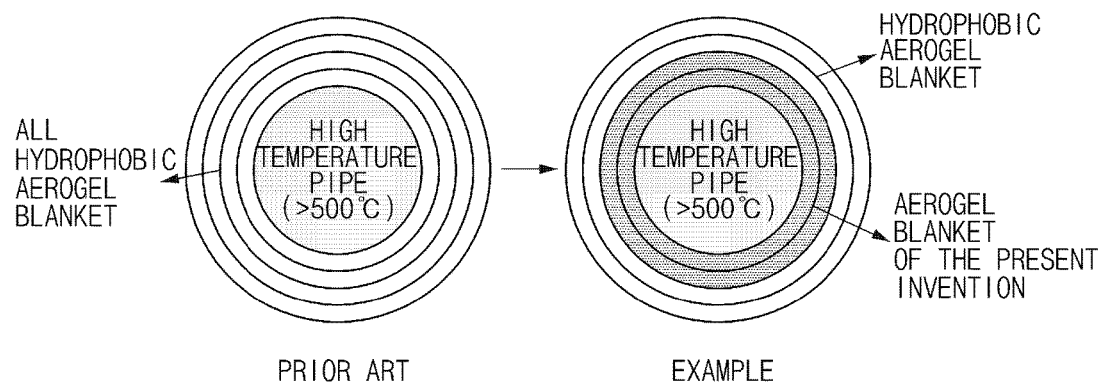
FIG. 2 is a schematic diagram a construction method of an aerogel blanket according to an embodiment of the present invention.

As shown in the schematic diagram of FIG. 2, the present invention may provide a construction method of an aerogel blanket including the steps of 1) constructing at least one layer of the hydrophilic aerogel blanket produced by the production method of the present invention on the surface of a piping equipment; and 2) constructing at least one layer of a hydrophobic aerogel blanket on the hydrophilic aerogel blanket. Specifically, the piping equipment be an ultra-high temperature piping equipment of 500° C. or higher.

Typically, when a hydrophobic silica aerogel blanket was constructed on an ultra-high temperature piping equipment of 500° C. or higher, a bad odor was generated from the hydrophobic silica aerogel blanket due to heat conducted in a pipe, thereby causing pain to workers.

However, according to the construction method of an aerogel blanket of the present invention, it is possible to fundamentally prevent the bad odor generation problem caused by a VOC by constructing a hydrophilic aerogel blanket produced by the production method of the present invention on the surface of the piping equipment first as in Step 1).

In addition, as in Step 2), when a hydrophobic aerobic blanket is secondarily constructed on the hydrophilic aerobic blanket of the present invention constructed on the surface of the piping equipment, the hydrophobic silica aerogel is constructed on the outermost layer which is in contact with the air, so that an effect of preventing an increase in thermal conductivity due to the absorption of moisture in the air may be obtained.

In this case, even though a hydrophobic silica aerogel blanket is used, the hydrophobic silica aerogel blanket is not directly constructed on the surface of an ultra-high temperature piping equipment, but constructed on the hydrophilic aerogel blanket of the present invention, so that heat conducted in a pipe is greatly reduced, and therefore a bad odor generation problem of may not occur.

As described above, according to the construction method of an aerogel blanket of the present invention, it is possible to obtain effects of suppressing the generation of a bad odor, and at the same time, preventing the loss of heat insulation performance due to moisture in the air.

Hereinafter, examples of the present invention will be described in detail so that those skilled in the art can easily carry out the present invention. The present invention may, however, be embodied in many different forms and is not limited to the examples set forth herein.

Example 1

Tetraethyl orthosilicate and ethanol were mixed in a weight ratio of 3:1 to prepare a mixed solution (silica content=4 wt %). Thereafter, a hydrochloric acid solution (concentration=0.15%) diluted in water was added thereto so that the pH of the mixed solution became 1, and then mixed to produce an alkoxide silica sol. An ammonia catalyst was added to the produced silica sol in an amount of 0.5% by volume for gelation to produce a silica wet gel composite. The produced silica wet gel composite was left in a mixed solution of ammonium hydroxide ($NH_4OH$, 30 wt % $NH_3$) and ethanol (ammonium hydroxide content=10 vol % of EtOH) at a temperature of 70° C. for 1 hour to be aged. Thereafter, the silica wet gel composite was placed in a supercritical extractor of 7.2 L and $CO_2$ was injected thereto. Thereafter, the temperature in the extractor was raised to 60° C. over the period of 1 hour, and supercritical drying was performed at 50° C. and 100 bar. At this time, ethanol was recovered through a lower end of a separator. Thereafter, $CO_2$ was vented over the period of 2 hours to produce a hydrophilic aerogel blanket.

Example 2

A hydrophilic aerogel blanket was produced in the same manner as in Example 1, except that potassium hydroxide (KOH) was used as a basic catalyst in an amount of 0.12 g/L of EtOH instead of ammonium hydroxide ($NH_4OH$) in Example 1.

Example 3

A hydrophilic aerogel blanket was produced in the same manner as in Example 1, except that pyridine was used as a basic catalyst in an amount of 10 vol % of EtOH instead of ammonium hydroxide ($NH_4OH$) in Example 1.

Example 4

A hydrophilic aerogel blanket was produced in the same manner as in Example 1, except that triethylamine was used as a basic catalyst in an amount of 10 vol % of EtOH instead of ammonium hydroxide ($NH_4OH$) in Example 1.

Example 5

A hydrophilic aerogel blanket was produced in the same manner as in Example 1, except that sodium hydroxide (NaOH) was used as a basic catalyst in an amount of 0.12 g/L of EtOH instead of ammonium hydroxide ($NH_4OH$) in Example 1.

Comparative Example 1

An aerogel blanket was produced in the same manner as in Example 1, except that a basic catalyst was not added.

Comparative Example 2

An aerogel blanket was produced in the same manner as in Example 1, except that aging was performed without adding a basic catalyst, a surface modifier solution prepared by mixing hexamethyldisilazane (HMDS) and ethanol in a volume ratio of 1:19 was added in an amount of 90 vol % based on the wet gel, and surface modification was performed at 70° C. for 4 hours to produce a hydrophobic aerogel blanket in Example 1.

Comparative Example 3

An aerogel blanket was produced in the same manner as in Example 1, except that after aging was performed, a surface modifier solution prepared by mixing hexamethyldisilazane (HMDS) and ethanol in a volume ratio of 1:19 was added in an amount of 90 vol % based on the wet gel, and surface modification was performed at 70° C. for 4 hours to produce a hydrophobic aerogel blanket in Example 1.

Comparative Example 4

A hydrophilic aerogel blanket was produced in the same manner as in Example 1, except that ammonium hydroxide ($NH_4OH$) was used in an amount of 2 vol % of EtOH in Example 1.

Comparative Example 5

A hydrophilic aerogel blanket was produced in the same manner as in Example 1, except that ammonium hydroxide ($NH_4OH$) was used in an amount of 30 vol % of EtOH in Example 1.

Experimental Example 1: Measurement of Flame Retardancy and the Presence or Absence of Bad Odor A wire was put into contact with an aerogel blanket sample produced in Example 1 and Comparative Example 3, and then the wire was heated to 1050° C. in order to observe smoke, a bad odor, and soot formation. The results are shown in Table 1 and FIG. 3.

Figure 3:
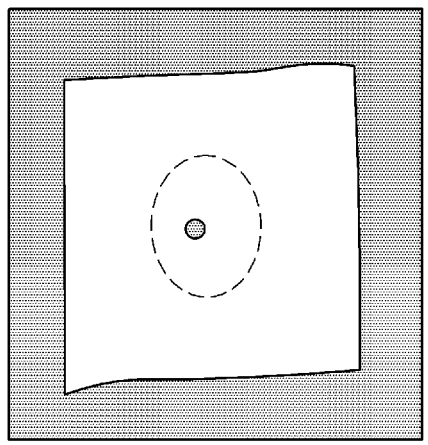
FIG. 3 is a photograph showing the result of flame retardancy test of a silica aerogel according to an example and a comparative example of the present invention.
Figure 3:
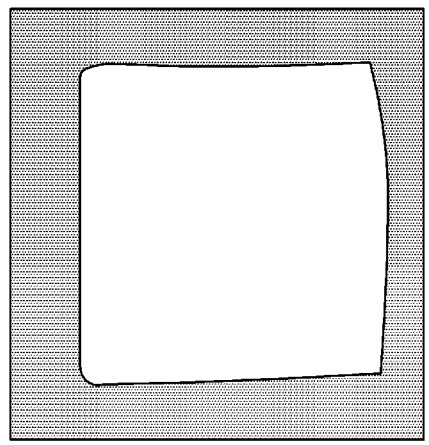

As shown in FIG. 3, in the case of Comparative Example 3 in which aging was performed by adding ammonium hydroxide as a basic catalyst and surface modification was performed, it was confirmed that smoke, sooth, and a bad odor were generated and flame appeared.

On the other hand, in the case of Example 1, in which aging was performed by adding the same ammonium hydroxide as in Comparative Example 3, but surface modification was not performed, it was confirmed that smoke, sooth, and a bad odor were not generated.

This attributes to an effect of Example 1 in which surface modification was not performed. Thus, it can be understood that a hydrophilic aerogel blanket of the present invention is capable of suppressing the generation of a bad odor by reducing a VOC compound, and improving flame retardancy.

Experimental Example 2: Measurement of Thermal Conductivity

Figure 4:
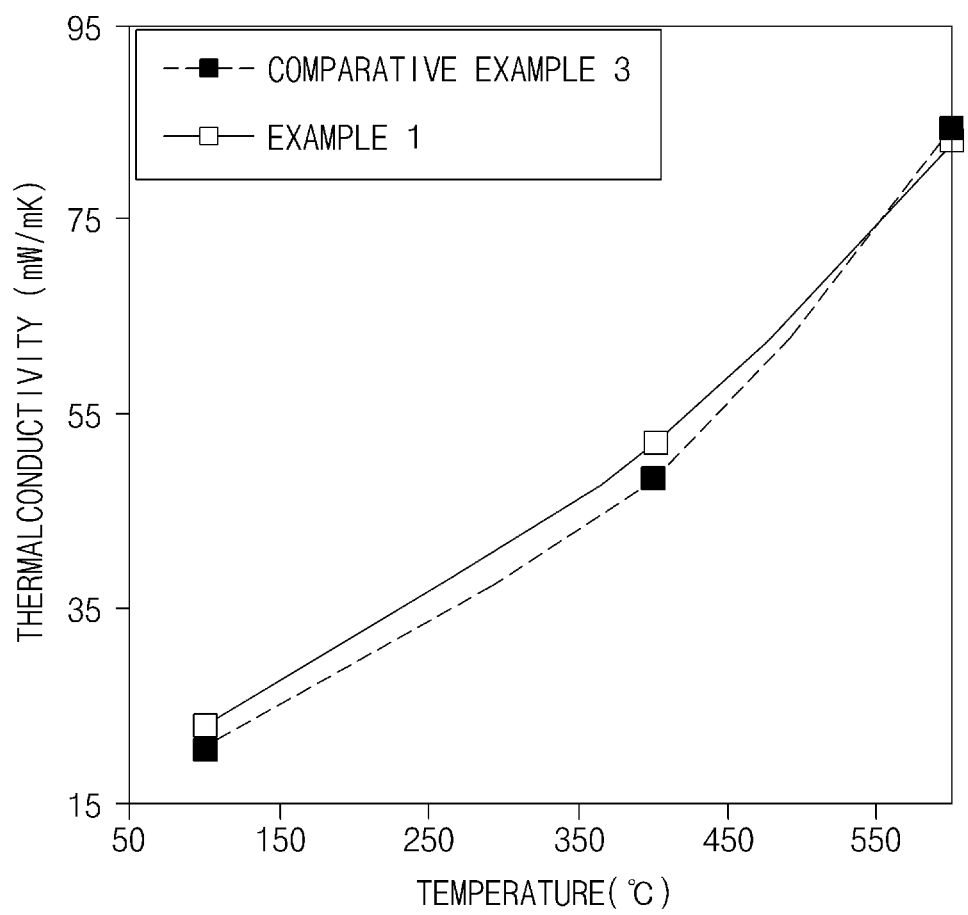
FIG. 4 is a graph showing the thermal conductivity of a hydrophilic aerogel blanket according to an example and a comparative example of the present invention.

The guarded hot plate (GHP) high temperature thermal conductivity of an aerogel blanket produced in Examples 1 to 5 Comparative Examples 1 to 5 was measured using GHP 456 equipment of NETZSCH Co., and the results are shown in Table 1 and FIG. 4.

As shown in Table 1, in the cases of Examples 1 to 5 in which an aging step was performed by adding a base catalyst, despite the fact that a surface modification step was not performed, the overall thermal conductivity was lower than that of Comparative Examples so that heat insulation performance was excellent.

TABLE 1

|  | Kind of basic catalyst in Step 4) | Amount of basic catalyst used in Step 4) | Presence or absence of surface modification | Presence or absence of bad odor | Thermal conductivity (mW/mK) |
| --- | --- | --- | --- | --- | --- |
| Example 1 | Ammonium hydroxide | 10 vol % of EtOH | X | X | 20.4 |
| Example 2 | Potassium hydroxide | 0.12 g/L of EtOH | X | X | 20.5 |
| Example 3 | Pyridine | 10 vol % of EtOH | X | X | 21.0 |
| Example 4 | Triethylamine | 10 vol % of EtOH | X | X | 22.0 |
| Example 5 | Sodium hydroxide | 0.12 g/L of EtOH | X | X | 20.6 |
| Comparative Example 1 | — | — | X | X | 32.0 |
| Comparative Example 2 | — | — | ◯ | ◯ | 24.0 |
| Comparative Example 3 | Ammonium hydroxide | 10 vol % of EtOH | ◯ | ◯ | 18.5 |
| Comparative Example 4 | Ammonium hydroxide | 2 vol % of EtOH | X | X | 30.0 |
| Comparative Example 5 | Ammonium hydroxide | 30 vol % of EtOH | X | X | 29.0 |

On the other hand, in Comparative Example 1, the thermal conductivity was significantly increased compared with other aerogel blankets. This attributes to an effect of performing an aging step without adding a basic catalyst and not performing surface modification. The pore structure was not strengthened and furthermore, the surface modification was not performed. As a result, due to the hydrophilic properties of a silanol group (Si—OH) on the surface of a silica, water in the air was absorbed, and the pore destruction was intensified in the drying process.

In Comparative Example 2, the aging step was performed by not adding a basic catalyst, but the surface modification step was performed in Comparative Example 2, unlike in Comparative Example 1. Therefore, the thermal conductivity of Comparative Example 2 was somewhat improved as compared with Comparative Example 1.

In Comparative Example 3, the aging step was performed by adding a basic catalyst so that the structure of the silica gel was strengthened. Furthermore, the surface modification step was additionally performed, so that the thermal conductivity was the lowest and the heat insulation performance was the most excellent.

At an ultra-high temperature of 500° C. or higher, the thermal conductivity was sharply increased to the same or similar level as that of Example 1 in which the surface modification was not performed, so that the difference in heat insulation performance from Example 1 was not large. However, as shown in Experimental Example 1 and FIG. 3, the effects of improving the flame retardancy and reducing a bad odor were lower than those of Example 1.

In other words, in the case of using an aerogel blanket for ultra-high temperature insulation as in Comparative Example 3, there was no difference in heat insulation performance from Example 1 of the present invention. However, since a surface modification step is additionally performed, there are problems in that the process becomes complicated, manufacturing cost is increased and a bad odor is generated. Therefore, as an aerogel blanket for ultra-high temperature insulation, Comparative Example 3 is not superior to Example 1.

In addition, in the case in which ammonium hydroxide is used as a basic catalyst to be added in the aging step, as in Comparative Examples 4 and 5, if ammonium hydroxide is added in an excessively small amount or an excessively large amount of 2 vol % or 30 vol % based on ethanol, the thermal conductivity was rather increased.

Therefore, in order to maximize the effect of the present invention, it is important to add an appropriate amount of basic catalyst as in Example 1.

Thus, by adding a specific amount of basic catalyst in an aging step and not performing a surface modification step, an aerogel blanket of the present invention may secure an excellent heat insulation performance for ultra-high temperature, and exhibit an effect of reducing a bad odor at the same time.

The foregoing description of the present invention has been presented for purposes of illustration. It will be understood by those skilled in the art that various changes in form and details may be made therein without departing from the spirit and scope of the invention. It is therefore to be understood that the above-described embodiments are illustrative in all aspects and not restrictive.

The invention claimed is:

1. A method for producing a hydrophilic aerogel blanket, comprising:
   1) preparing a silica sol by mixing a silica precursor, alcohol, and an acidic aqueous solution;
   2) adding a basic catalyst to the silica sol, and then depositing the silica sol containing the basic catalyst in a base material for a blanket;
   3) subjecting the silica sol to a gelation reaction while being in a state of being deposited in the base material for the blanket to form a silica gel;
   4) adding a mixed solution of a basic catalyst and an alcohol to the silica gel produced upon completion of the gelation reaction and aging the silica gel added with the mixed solution, wherein the basic catalyst of Step 4) comprises ammonium hydroxide or potassium hydroxide, wherein the ammonium hydroxide is added in an amount of 10 to 20 vol % based on the alcohol, or the potassium hydroxide is added in an amount of 0.05 to 0.15 g/L based on the alcohol; and
   5) drying the aged silica gel.

2. The method of claim 1, wherein the basic catalyst of Step 2) comprises one or more selected from the group consisting of sodium hydroxide (NaOH), potassium hydroxide (KOH), calcium hydroxide ($Ca(OH)_2$), ammonium hydroxide ($NH_4OH$), tetramethylammonium hydroxide (TMAH), tetraethylammonium hydroxide (TEAH), tetrapropylammonium hydroxide (TPAH), tetrabutylammonium hydroxide (TBAH), methylamine, ethylamine, isopropylamine, monoisopropylamine, diethylamine, diisopropylamine, dibutylamine, trimethylamine, triethylamine, triisopropylamine, tributylamine, choline, monoethanolamine, diethanolamine, 2-aminoethanol, 2-(ethylamino) ethanol, 2-(methylamino) ethanol, N-methyldiethanolamine, dimethylaminoethanol, diethylaminoethanol, nitrilotriethanol, 2-(2-aminoethoxy) ethanol, 1-amino-2-propanol, triethanolamine, monopropanolamine, dibutanolamine and pyridine.

3. The method of claim 1, wherein the aging of Step 4) is performed at a temperature of 30 to 70° C.

4. The method of claim 1, wherein a surface modification step is not performed in the production method of a hydrophilic aerogel blanket.

5. The method of claim 1, wherein the base material for the blanket comprises one or more materials selected from a film, a sheet, a net, a fiber, a porous body, a foam, and a non-woven body.

6. The method of claim 1, wherein the drying is performed by a supercritical drying process, or an ambient drying process.

7. The method of claim 1, wherein the hydrophilic aerogel blanket is for ultra-high temperature heat insulation of 500° C. or higher.

8. A hydrophilic silica aerogel blanket produced by the method of claim 1.

9. A construction method of an aerogel blanket, the method comprising:
   1) constructing at least one layer of the hydrophilic aerogel blanket of claim 8 on the surface of a piping equipment; and
   2) constructing at least one layer of a hydrophobic aerogel blanket on the hydrophilic aerogel blanket.

10. The method of claim 9, wherein the piping equipment is a piping equipment for ultra-temperature of 500° C. or higher.

* * * * *